Figure 2:
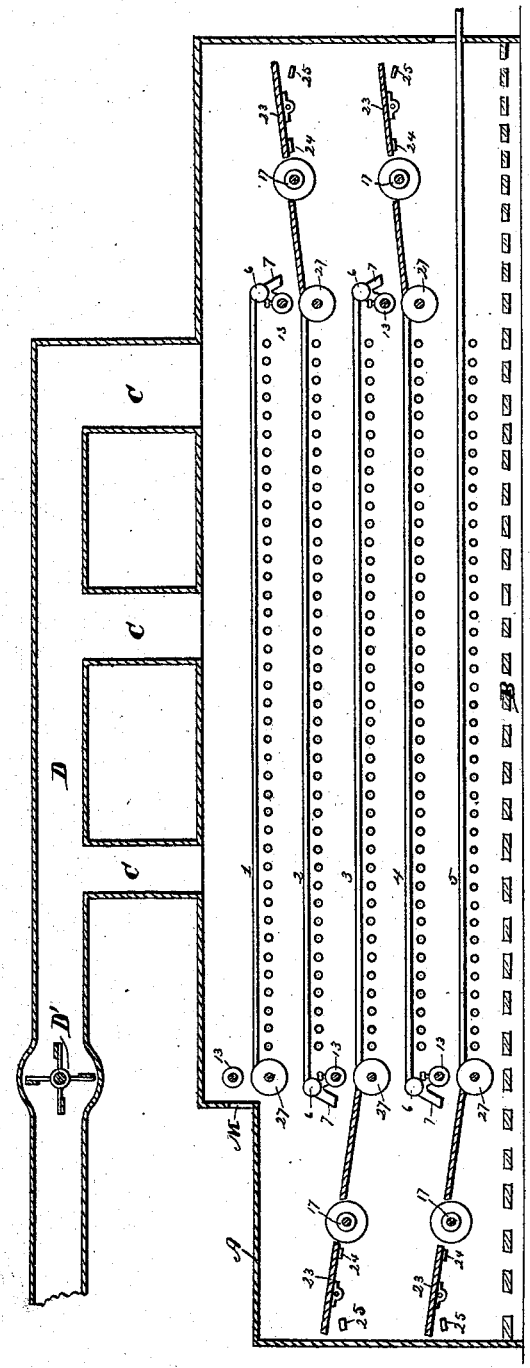

(No Model.) 3 Sheets—Sheet 1.
E. WHITE.
FRUIT DRIER.
No. 413,589. Patented Oct. 22. 1889.
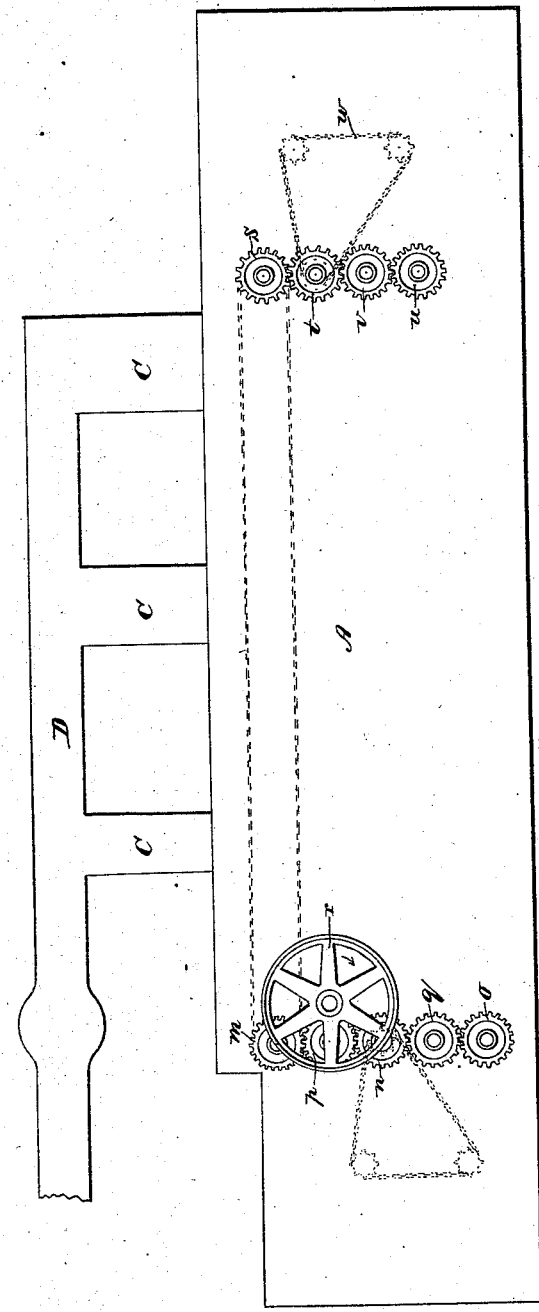
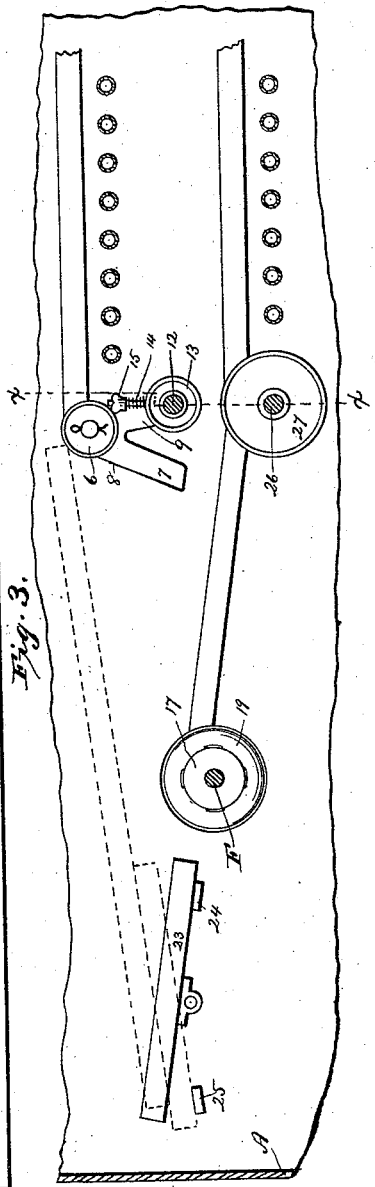
Witnesses.
Chas. R. Bill.
Thomas Durant
Inventor.
Eli White
by Church & Church
his Attorneys.

(No Model.) 3 Sheets—Sheet 2.

E. WHITE.
FRUIT DRIER.

No. 413,589. Patented Oct. 22, 1889.

Witnesses.
Chas. R. Burr.
Thomas Durant.

Inventor.
Eli White
by Church & Church
his Attorneys.

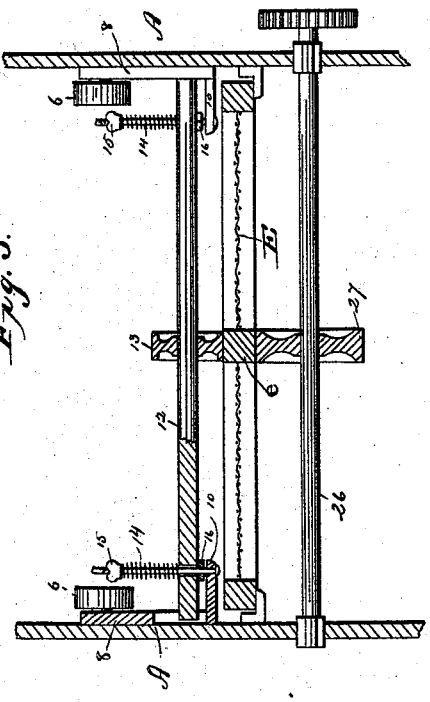

UNITED STATES PATENT OFFICE.

ELI WHITE, OF MOUNT MORRIS, ASSIGNOR TO THE EXCELSIOR STEAM EVAPORATOR COMPANY, OF PERRY, NEW YORK.

FRUIT-DRIER.

SPECIFICATION forming part of Letters Patent No. 413,589, dated October 22, 1889.

Application filed October 16, 1888. Serial No. 288,260. (No model.)

*To all whom it may concern:*

Be it known that I, ELI WHITE, of Mount Morris, Livingston county, and State of New York, have invented certain new and useful Improvements in Fruit-Driers; and I do hereby declare the following to be a full, clear, and exact description of the same, reference being had to the accompanying drawings, forming a part of this specification, and to the figures and letters of reference marked thereon.

My present invention relates to fruit driers or evaporators of the class known as "automatic," in which the sliced fruit in trays is fed into the upper portion of the apparatus in a green or wet state and is removed at another thoroughly dried, the trays being passed in proximity to suitable heating apparatus, preferably steam-heated coils, and automatically transferred from one level to another;
and it has for its object to improve the construction and operation of driers, particularly of the mechanism by which the transfer of the trays from one level to another is performed, and the means for moving the trays through the chamber; and to these ends it consists in certain novelties of construction and combinations of parts, all as will be hereinafter described, and the novel features pointed out particularly in the claims at the end of this specification.

In drying fruit in a drier in which the trays travel from end to end it is very desirable that the green fruit be inserted at the top of the chamber, or at least near the exit-passage for the moisture-laden air, so that the fruit more thoroughly dried can be acted upon by fresh warm air capable of containing more moisture, and therefore of receiving and carrying off what remains in the fruit, and it is also desirable to have the fruit-trays placed in as close proximity to the heating devices as possible, and if they move at different levels with the heating devices between to have the spaces between them very short, thus not only economizing room and enlarging the capacity of the drier, but bringing the fruit close to the heating devices.

Prior to my invention it has been proposed to construct a drier with a series of ways at different levels, along which the trays are propelled by suitable driving devices, the change from one level to another being effected by suitable inclines, down which the trays are arranged to slide by gravity; but in such apparatus it is necessary to have such a space between the different levels that in order to have the trays operate properly the size of the apparatus is unduly increased, and the heating flues or pipes required larger and more numerous.

My present invention embodies all of the desirable features noted above and none of the objectionable ones, the apparatus being compact, serviceable, and automatic in its operation.

Figure 4:
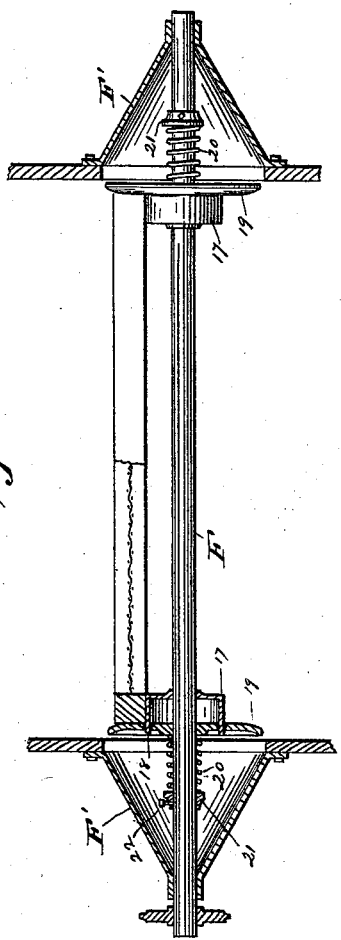

In the drawings, Figure 1 is a side view of an evaporator constructed in accordance with my invention; Fig. 2, a longitudinal sectional view of the same; Fig. 3, an enlarged view of the tray-transferring device; Fig. 4, a view, partly in section, of the friction-driving portion of the apparatus for transferring the trays to different levels; Fig. 5, a sectional view on the line *x x* of Fig. 3; Fig. 6, a sectional view of the pressure-roll-adjusting device; Fig. 7, a view of one of the fruit-trays; Fig. 8, a view of a modification.

Similar letters of reference in the several figures indicate similar parts.

The letter A indicates the main casing of the apparatus, provided with a slotted bottom B for the entrance of air, and at the top with three (more or less) exit-passages C, communicating with a trunk D, in which is located fan D', for the purpose of exhausting the moisture-laden air from and causing a circulation through the chamber. Inside the chamber are provided a series of ways or tracks 1 2 3 4 5, formed by strips attached to the sides and arranged at different levels, as shown, upon which the trays E (see Fig. 7) are carried by suitable driving mechanism presently described. One end of each of these ways, that from which the trays pass to a different level, is provided with a roller 6 and a short incline 7, forming, preferably, a portion of a casting 8, (shown in detail, Fig. 6,) and attached by suitable securing devices to the side of the chamber. Each of these castings is also provided with a depending slotted portion 9, having an inwardly-projecting lug 10, to which is secured one end of a rod or bolt passing up through a shaft 12, which latter passes through and is guided in the slot in 9. The shaft 12 does not revolve, but carries at its central portion a wheel 13, adapted to press upon the central rib e of the tray, and is held down by springs 14, encircling the bolts 10 and arranged between the said shaft and a thumb-nut 15, by means of which latter the tension can be adjusted as desired. In order to prevent the shaft and roller moving too far down when there is no tray underneath, I provide a nut 16 on said bolt capable of being adjusted up or down. It is not essential that these shaft-adjusting devices be mounted on these castings; but as they in practice form part of them I have described them specifically at this stage. These inclines 7 are arranged at one end of each of the various levels alternately, as shown, and at the opposite ends of each level the ways are preferably inclined slightly upward, and at the ends of each of these inclines is arranged a shaft F, mounted in suitable bearings preferably formed in conical castings F', secured to the sides, as in Fig. 4, and arranged to be rotated in the direction indicated by the arrows by sprocket-wheels mounted on one end and connected with one of the transverse shafts, as indicated in full and dotted lines. Secured upon the shafts are two drums or carrying-wheels 17, their surfaces projecting slightly above the inclines, having outwardly-projecting teeth or projections 18, arranged to engage corresponding recesses in friction-disks 19, mounted on the shaft and permitting a limited longitudinal movement thereon, and being pressed into engagement by springs 20, encircling the shaft, arranged between said disks, and suitable collars 21, secured in position by suitable screws 22. The peripheries of the disks are made flaring slightly, as shown, and their distance apart is such that the tray will, when dropped between them, force them outward slightly against the tension of the springs, causing the tray to be driven into the next lower level by friction, the bearing portions 17 supporting said tray. The adjustability of the springs will permit the force with which the trays are grasped to be regulated as desired, and thus not only the slight differences that may exist in the width of the tray may be compensated for, but wider trays than the standard size be employed, if desired.

Just beyond the frictional driving apparatus just described, and at a slightly higher level, are arranged pivoted strips or levers 23, and on the sides of the casing suitable stops 24, for limiting their tilting motion, the levers being so weighted that in normal position they will be in line with the inclined position of the lower way of the two, between which they are arranged, as in full lines, Fig. 3, while their backward-tilting motion may be regulated by stops 25, if desired, though this is not absolutely necessary. The lower portion of the levers is so arranged relative to the friction-wheels 17 19 that the distance between the end of the upper way and the length of the trays employed is such that when the latter are moved off the said way the outer end will strike the levers and be held just above the friction-wheels while moving outward until the pivotal center of the levers is passed and the inner end slides down the incline 7, when the tray will be forced between the disks 19 and will be carried in the drier again at the lower level.

While the friction exerted by the devices just described might in some instances be sufficient to properly propel the whole series of trays if it were located directly below the incline 7, so that the end only was engaged, I prefer to employ auxiliary devices for driving them and permit the first-mentioned devices to perform the transferring alone.

Arranged beneath the adjustable shaft 12 is a shaft 26, journaled in suitable bearings in the casing and provided at or near the center with a wheel 27, with its upper face slightly above that of the ways, between which and wheel 13 the central rib e of the tray is adapted to be grasped, the latter holding the tray in contact by spring-pressure and turning freely on its shaft, while wheel 27, being positively driven, forces each tray and also the preceding ones on that level through the drier to the transferring device at the other end.

The trays are, as shown, provided with small rollers or wheels $e'$ $e'$ on their lower sides, causing them to run more easily on the tracks, and with the ribs at the center on which the driving devices operate; but it will be understood that, if desired, instead of driving by the central rib two driving-wheels could be placed on the shaft 26, co-operating with two wheels above, and these be arranged to grasp and drive the trays at the edges. Also, instead of locating the frictional drivers 17 19 at the outer edges of the trays, they could be placed at the center, as shown in Fig. 8, and operate upon the central ribs of the trays, if desired, this construction embodying the same features as the other, in that it has a central supporting wheel or surface with gripping-disks at the sides thereof, the only difference being that in the preferred construction the disks are wider apart. Instead of making both disks movable, one might be secured rigidly and only one permitted to move to grip the trays.

As far as the operation of the shifting devices is concerned, it is entirely immaterial what the construction of the tray-driving mechanism is, and, though I prefer that shown, the continuous sprocket-chain acting upon projections on the trays might be used, as shown in my prior patent, No. 378,483.

The steam-radiators employed for heating this drier I prefer to construct as in my above-referred-to patent, and I arrange them directly beneath each level and the levels very close together, so that the size of the apparatus is materially decreased and the fruit brought into close contact with the hot pipes.

The various operating parts of the drier are geared for simultaneous operation, as shown in Fig. 1, the gears $m$ $n$ $o$ being arranged on the shafts 26 at the forward end with idlers $p$ $q$ between and a belt-wheel $r$, and the frictional transferring-shafts are driven by a sprocket-chain (shown in dotted lines) from the shaft of the middle driving-rollers.

The driving-rollers at the rear of the apparatus are connected by a chain (shown in dotted lines) through an idler $s$, which transmits motion to the shafts 26 through gears $t$ $u$ and idler $v$, while the friction-transferring rollers are driven by a chain $w$. Of course any other desired form of gearing could be employed instead of that shown.

Assuming the different levels to be full of trays and the shafts all running at the same surface speed, the operation will be as follows: The operator inserts the trays in the aperture M, where they are caught between the rollers 13 and 27 and moved along the way, each succeeding one pushing all the others before it until the tray at the end tilts over the roller 6 and its end comes in contact with the pivoted levers 23, and then, riding up these, tilts and slides on them until the rear end slides down the incline 7 and the tray drops between disks 19, which grasp the sides and feed it between wheels 13 and 27 of level 2, the tray at the end of this one being transferred to level 3, and so on down, these operations being kept up continuously, and the trays of thoroughly-dried fruit are ejected at the aperture N at the rear of the machine continuously, the speed being regulated as desired.

Of course many modifications will at once suggest themselves to those skilled in the art, and I therefore do not desire to be confined to precisely the arrangement shown—as, for instance a short stationary inclined strip could be employed instead of the pivoted levers, extending from just beyond the driving-shaft F' to the pivotal point of the levers 23, the operations being in all essentials the same; but I prefer the arrangement shown.

I claim as my invention—

1. In a drier in which the material is placed on trays, the combination, with a series of suitable ways arranged in different planes, of a positively-rotated wheel located between said ways beyond the end of the upper one and a support beyond the wheel for sustaining the end of the tray above said wheel, substantially as described.

2. In a drier of the kind described, the combination, with a series of ways arranged in different planes, of a rotating wheel located between said ways beyond the end of the upper one and a tilting support beyond the wheel for sustaining the end of the tray above said wheel, substantially as described.

3. In a drier of the kind described, the combination, with a series of ways arranged in different planes, of a rotating wheel located between said ways beyond the end of the upper one, a support beyond the wheel, and mechanism, substantially as described, for moving the trays in succeeding planes in opposite directions, as set forth.

4. In a drier of the kind described, the combination, with the series of ways arranged in different planes having inclines at opposite ends alternately, of a rotating wheel located near each of said inclines between the ways and beyond the ends of the upper one and a support for the end of the tray beyond said wheel, substantially as described.

5. In a drier, the combination, with a series of ways arranged in different planes, of a series of trays adapted to travel thereon, a pair of rollers at alternately opposite ends of each way, between which the trays are grasped and moved, one at least of said rollers being driven, and supports beyond the ends of the ways for permitting the transfer of the trays from one way to another, substantially as described.

6. In a drier, the combination, with a series of ways arranged in different planes, of a rotating shaft having spring-pressed gripping-disks thereon arranged beyond and below one end of each of the ways, said disks arranged to engage on one side their centers with the trays, so as to drive them, substantially as described.

7. In a drier, the combination, with a series of ways arranged in different planes, of a rotating shaft having spring-pressed gripping-disks thereon arranged beyond and below one end of each of the ways and supports for the tray ends beyond said shaft, substantially as described.

8. In a drier, the combination, with a series of ways arranged in different planes, of a rotating shaft having a supporting surface or wheel and spring-pressed gripping-disks thereon beyond and below one end of each of the ways, substantially as described.

9. In a drier, and as a means for moving the trays, the shaft having a supporting wheel or surface and spring-pressed gripping-disks connected so as to rotate with said shaft and arranged to support and move the trays, substantially as described.

10. In a drier, the combination, with two ways, the castings at the end having the inclines 7 thereon, the driving-roller for the next succeeding way arranged beneath, and the spring-pressed co-operating roller supported from said casting, substantially as described.

11. The combination, with the shaft having the supporting-wheel thereon provided with laterally-projecting teeth, of a disk having recesses for the teeth movable longitudinally on the shaft and a spring for moving said disk toward the wheel, substantially as described.

12. The combination, with the shaft having the supporting wheel or surface thereon, of disks located on opposite sides said supporting-surface movable on the shaft, interlocking projections and recesses for causing the simultaneous movement of the disks and wheel, and springs for pressing the disks toward the supporting-surface, substantially as described.

13. The combination, with the shaft having the supporting wheel or surface thereon, of the disks located on opposite sides the supporting-surface and movable longitudinally on the shaft, interlocking projections and recesses for causing the simultaneous movement of the disks and wheel, collars secured to the shaft, and springs between the collars and disks, substantially as described.

ELI WHITE.

Witnesses:
FRED F. CHURCH,
Z. L. DAVIS.